United States Patent
Grover et al.

(10) Patent No.: US 12,348,387 B2
(45) Date of Patent: Jul. 1, 2025

(54) AUGMENTED REALITY EXPERIENCE EVENT METRICS SYSTEM

(71) Applicant: Snap Inc., Santa Monica, CA (US)

(72) Inventors: Benjamin Todd Grover, Mercer Island, WA (US); Taras Lazarenko, Marina Del Rey, CA (US); Elliot Lewis, St. Petersburg, FL (US); Michael Aubrey Powell, Oakland, CA (US); Jialu Zhao, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/543,475

(22) Filed: Dec. 18, 2023

(65) Prior Publication Data
US 2024/0121169 A1    Apr. 11, 2024

Related U.S. Application Data

(63) Continuation of application No. 17/727,972, filed on Apr. 25, 2022, now Pat. No. 11,894,989.

(51) Int. Cl.
*H04L 41/40* (2022.01)
*H04L 41/50* (2022.01)
*H04L 67/50* (2022.01)

(52) U.S. Cl.
CPC ............ *H04L 41/50* (2013.01); *H04L 67/535* (2022.05)

(58) Field of Classification Search
CPC ...... H04L 41/50; H04L 67/535; H04L 67/131
USPC ........................................................ 709/223
See application file for complete search history.

(56) References Cited

U.S. PATENT DOCUMENTS

| | | | |
|---|---|---|---|
| 10,505,825 B1* | 12/2019 | Bettaiah | ................. H04L 43/20 |
| 11,894,989 B2 | 2/2024 | Grover et al. | |
| 2014/0157422 A1 | 6/2014 | Livshits et al. | |
| 2016/0155272 A1 | 6/2016 | Polo et al. | |
| 2018/0189338 A1 | 7/2018 | Kim et al. | |
| 2019/0018656 A1 | 1/2019 | Monsarrat | |

(Continued)

FOREIGN PATENT DOCUMENTS

| | | |
|---|---|---|
| CN | 119111066 A | 12/2024 |
| WO | WO-2019245604 A1 | 12/2019 |
| WO | WO-2023211701 A1 | 11/2023 |

OTHER PUBLICATIONS

Generic | definition in the Cambridge English Dictionary https://dictionary.cambridge.org/us/dictionary/english/generic#google_vignette.*

(Continued)

*Primary Examiner* — Tan Doan
(74) *Attorney, Agent, or Firm* — Schwegman Lundberg & Woessner, P.A.

(57) ABSTRACT

Methods and systems are disclosed for performing generating AR experiences on a messaging platform. The methods and systems receive, from a client device, a request to access an augmented reality (AR) experience and access a list of event types associated with the AR experience used to generate one or more metrics. The methods and systems determine that an interaction associated with the AR experience corresponds to a first event type of the list of event types and generates interaction data for the first event type representing the interaction. In response to receiving a request to terminate the AR experience, the systems and methods transmit the interaction data to a remote server.

20 Claims, 11 Drawing Sheets

(56) References Cited

U.S. PATENT DOCUMENTS

| | | | |
|---|---|---|---|
| 2019/0068519 | A1 | 2/2019 | Laird et al. |
| 2019/0179407 | A1 | 6/2019 | Ziegler et al. |
| 2019/0245873 | A1* | 8/2019 | Wu .................. H04L 41/0681 |
| 2021/0027458 | A1* | 1/2021 | Chor .................. G06V 20/20 |
| 2021/0142255 | A1* | 5/2021 | Mahajan ............. G06Q 10/10 |
| 2021/0409517 | A1* | 12/2021 | Luo .................... G06F 3/011 |
| 2022/0028108 | A1 | 1/2022 | Haapoja et al. |
| 2022/0100336 | A1 | 3/2022 | Luo et al. |
| 2022/0198289 | A1 | 6/2022 | Guo et al. |
| 2023/0344728 | A1 | 10/2023 | Grover et al. |

OTHER PUBLICATIONS

"Analytics Metrics, Segments, and Terminology", Unity Manual Version 2021.3, [Online] Retrieved form the Internet: <URL: https://docs.unity3d.com/Manual/UnityAnalyticsTerminology.html>, (Apr. 9, 2022), 15 pgs.

"U.S. Appl. No. 17/727,972, Non Final Office Action mailed Jun. 22, 2023", 12 pgs.

"U.S. Appl. No. 17/727,972, Notice of Allowance mailed Sep. 25, 2023", 9 pgs.

"U.S. Appl. No. 17/727,972, Response filed Aug. 28, 2023 to Non Final Office Action mailed Jun. 22, 2023", 10 pgs.

"Gain Insights with Analytics", Apple App Store Connect, [Online] Retrieved from the Internet: <URL: https://developer.apple.com/app-store-connect/analytics/>, (accessed Apr. 14, 2022), 5 pgs.

"Google Play Console Statistics", [Online] Retrieved from the Internet: <URL: https://play.google.com/console/about/stats/>, (accessed Apr. 14, 2022), 10 pgs.

"Insights for Effects", Spark AR, [Online] Retrieved from the Internet: <URL: https://sparkar.facebook.com/ar-studio/learn/publishing/insights-for-facebook-effects/#sharing>, (accessed Apr. 14, 2022), 8 pgs.

"International Application Serial No. PCT/US2023/018636, International Search Report mailed Aug. 7, 2023", 3 pgs.

"International Application Serial No. PCT/US2023/018636, Written Opinion mailed Aug. 7, 2023", 6 pgs.

"International Application Serial No. PCT/US2023/018636, International Preliminary Report on Patentability mailed Nov. 7, 2024", 8 pgs.

* cited by examiner

AUGMENTED REALITY EXPERIENCE EVENT METRICS SYSTEM

PRIORITY

This application is a continuation of U.S. patent application Ser. No. 17/727,972, filed Apr. 25, 2022, which is incorporated by reference herein in it entirety.

TECHNICAL FIELD

The present disclosure relates generally to generating augmented reality (AR) experiences on messaging applications.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
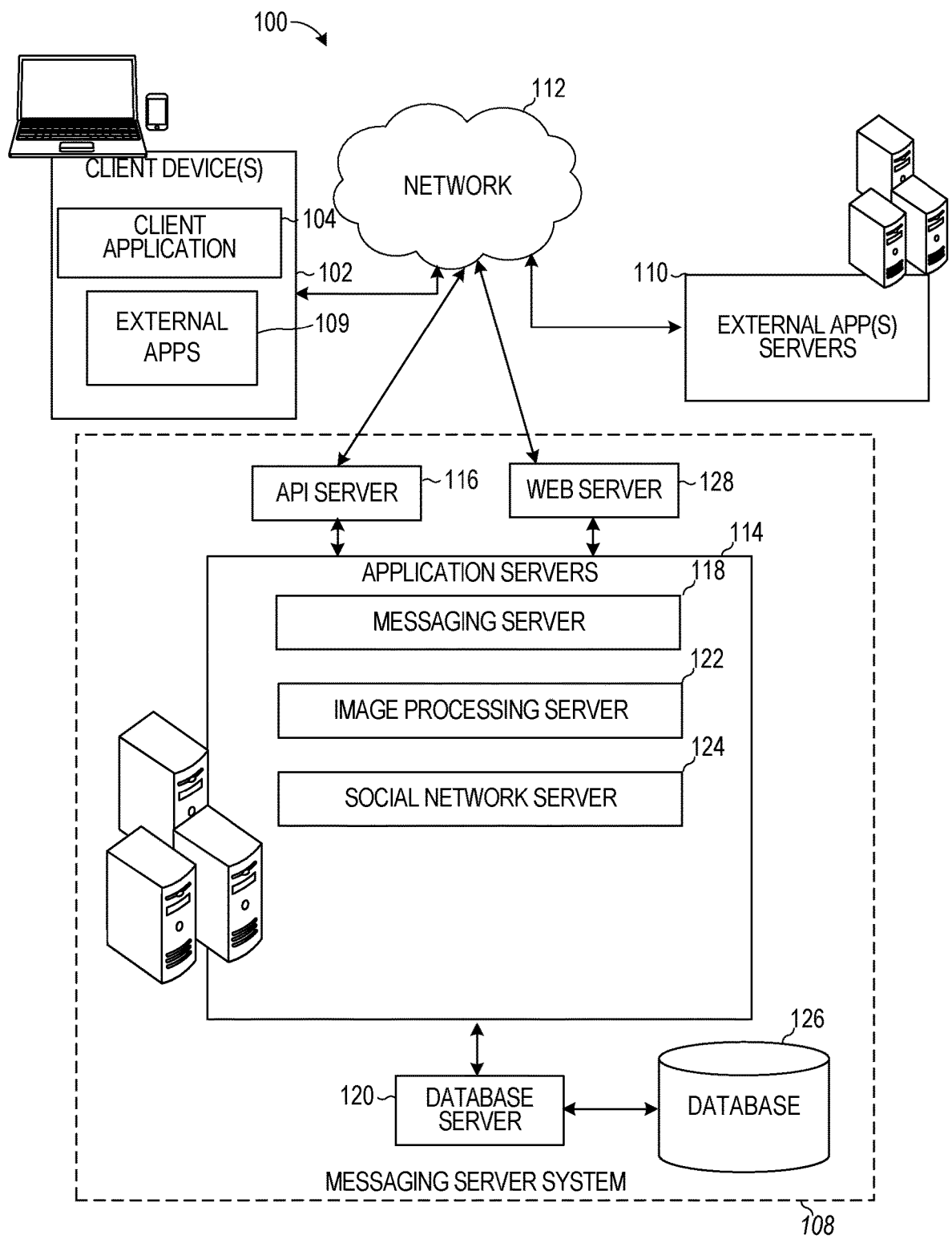
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Messaging applications typically enable end users to access various AR experiences by launching an AR experience bundle or package that includes the AR content associated with the AR experiences. The AR experiences typically present AR elements that are animated or that are anchored to particular positions. This allows the users to move around in the real-world and have the AR elements remain in place or move around in a similar manner. In order to ensure that the AR experiences remain in full operating condition with a minimal amount of bugs and to improve certain features of the AR experiences, AR experience developers seek information on how the AR experiences function overall. Specifically, AR experience developers need feedback on what features of the AR experience are used and which features present issues. However, current systems can only provide general metrics about AR experiences and cannot track a level of interaction with the AR experience on a feature by feature basis. The general metrics are the same across all of the AR experiences developed by many different entities and do not represent the unique attributes and features of each particular AR experience. As a result, AR experience developers remain at a loss with respect to how certain features of the AR experience function and how such features are accessed and interacted by end users. This forces the AR developers to guess as to what improvements should be made to AR experiences, which can be time-consuming and can waste resources. This can reduce the interest level end users have in accessing the AR experiences again, which causes missed opportunities.

The disclosed techniques solve these technical issues by tracking interactions with certain features, selected by AR experience developers, across devices and across different times or instances in which the AR experiences are launched. To do so, the disclosed techniques, executing on a computing system, receive, from a client device, a request to access an AR experience. The disclosed techniques access a list of event types associated with the AR experience used to generate one or more metrics. The disclosed techniques determine that an interaction associated with the AR experience corresponds to a first event type of the list of event types and generate interaction data for the first event type representing the interaction. In one example, the first event type is selected by the AR developer as an AR event to track. The disclosed techniques receive a request to terminate the AR experience, and in response, transmit the interaction data to a remote server. This interaction data can provide feedback to the AR experience developers on the interactions users have with certain features of the AR experiences on a feature-by-feature level of basis.

In some examples, an AR development platform is provided to an AR experience developer. The AR development platform can present a user interface to the AR experience developer that enables the AR developer to select which AR elements are to be tracked and used to generate metrics for the AR experience. The graphical user interface presents a list of AR events associated with the AR experience and includes a first option associated with a first AR event of the list of AR elements. The first option is configured to cause interactions corresponding to the first AR event to be tracked and provided to a remote server for aggregation after termination of the AR experience in response to selection of the first option.

In some examples, the list of AR events includes predefined AR events that can be tracked. In some examples, the list of AR events includes a list of custom AR events generated by the AR developer. The list can include a mix of predefined events to track and custom AR events selected to be tracked by the AR developer which are not included in the list of predefined events. The graphical user interface also includes a second option associated with the first AR event to specify one or more conditions for triggering the first AR event in response to selection of the second option. This provides a greater amount of flexibility for a developer to create useful, interesting and engaging AR experiences without being restricted by the resource constraints of the messaging applications and/or client devices that run the AR experiences.

The techniques described herein improve the efficiency of using the electronic device and the overall experience of the user in using the electronic device. Also, by customizing and automating the tracking of AR feature or event usage across devices, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a client application 104 and other external applications 109 (e.g., third-party applications). Each client application 104 is communicatively coupled to other instances of the client application 104 (e.g., hosted on respective other client devices 102), a messaging server system 108 and external app(s) servers 110 via a network 112 (e.g., the Internet). A client application 104 can also communicate with locally-hosted third-party applications, such as external apps 109, using Application Programming Interfaces (APIs). The client application 104 can include a messaging client, messaging application, and/or an AR developer application or an AR development client.

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

In some examples, the client device 102 can be operated by an AR experience developer. In such cases, the AR experience developer (or AR developer) accesses an AR experience development platform. The AR experience development platform allows the AR developer to generate an AR experience bundle that includes a set of AR elements and events or triggers of different types. In some examples, the AR developer can specify conditions under which the set of AR events or triggers are tracked and aggregated into a set of metrics. In some examples, various standard events or triggers are tracked without input from the AR developer in an automatic manner. In some examples, a set of custom events or triggers are added to a list of custom events to track automatically in response to determining that certain AR components have been enabled, configured, or included in the AR experience bundle. In such circumstances, the events or triggers are automatically tracked on an individual basis for each AR experience for which the corresponding AR component has been enabled. AR components can include any type of functionality available on an AR experience, such as object tracking, face tracking, location tracking, camera view, and so forth.

In some examples, when the AR experience is launched or accessed on an end user client device 102, the interactions corresponding to the events or triggers performed by the end user are tracked and aggregated into a set of metrics in response to determining that an interaction performed corresponds to one of the event or trigger types that are associated with the AR experience (e.g., those events or triggers that are manually specified or programmed by the AR experience developer, standard events or triggers that are automatically included for tracking, and/or events or triggers that are automatically added for tracking in response to certain components being enabled). After the AR experience is terminated, any tracked interactions (based on the predefined event or trigger types) are added to a bulk message and transmitted to a remote server for presentation to the AR experience developer.

In some examples, the conditions can include geographical locations, levels in a gaming application or AR experience, views or depictions of real-world environment portions, time, time of day, client device type, user type, user account type, location markers, image markers, or any other suitable condition. The types of events or triggers can include any unique feature of the AR experience. In some examples, a type of event or trigger that can be tracked and used to generate one or more metrics can include any combination of a face found event, a face lost event, an object tracking criterion, a 3D object tracking criterion, a marker tracking component, a tap event, a touch started event, a touch moved event, a touch ended event, a shared session event, a shared session joined event, a voice command event, a voice transcription event, and/or a language event. In some examples, the conditions can be manually programmed and stored as part of the AR experience bundle. In some examples, the conditions are set by the AR developer selecting between various options for setting certain conditions in association with a component and/or event or trigger. In some examples, the conditions are predetermined and set when a given component is added to the AR experience bundle. In this way, a given AR experience bundle can be associated with standard events that are tracked and separately or together be associated with custom events or triggers that are added in response to addition of certain components to the AR experience bundle. In some examples, the standard list of events and triggers cannot be disabled by the AR developer for tracking. In such cases, only the custom events or triggers can be disabled for tracking, such as by removing the AR component or deselecting a tracking option for the corresponding custom event or trigger.

In some examples, the face found event can be associated with a condition or trigger that is satisfied when a new face (or other designated object) is detected by a camera of a client device 102. In such cases, a first counter can be started to compute or measure the total number of face found events or the average number of face found events per session (e.g., per time between starting the AR experience and ending the AR experience). In some examples, the face lost event can be associated with a condition or trigger that is satisfied when a face (or other designated object) is no longer detected and tracked (e.g., if the face gets blocked from the camera's view or is too far away). In such cases, a second counter can be started to compute or measure the total number of times the face lost events per session or the average number of faces lost in a session.

In some examples, the object tracking criterion is associated with a condition or trigger that is satisfied when an object is currently tracked by a camera of a client device 102 of an end user. A third counter can be used to count the total number or average number of times the object is tracked in a given session. In some examples, a separate 3D object tracking criterion can be used to separately track the number of 3D objects that are tracked by a camera of the client device 102. In some examples, a marker tracking criterion can be associated with a condition or trigger that is satisfied when a marker image is currently tracked by a camera. A fourth counter can be used to count the total or average number of times the marker image is tracked.

In some examples, a tap event is associated with a condition or trigger that is satisfied when a touch input is detected by the client device 102. A fifth counter can be used to count the total number or average number of times the touch input is detected during a given session. A similar condition or trigger can be used to track the number of times a user starts touching a screen, or when the user moves a finger while holding a screen touch (dragging on the screen), and/or when the user ends a screen touch (e.g., by lifting the finger from the screen).

In some examples, a shared or multi-user AR shared session is associated with a condition or trigger that is satisfied when a shared AR session is shared with another user. A sixth counter can be used to count the total number or average number of times the AR session was shared with other users. A similar condition or trigger can be used to track the number of times the shared AR session was joined by other users.

In some examples, a voice command event is associated with a condition or trigger that is satisfied when a voice navigation command (e.g., using natural language processing) is detected by the client device 102. A seventh counter can be used to count the total number or average number of times the voice command event is detected during a given session. A voice transcription event is associated with a condition or trigger that is satisfied when a speech is transcribed in real time during recording or for a stored video clip. An eighth counter can be used to count the total number or average number of times the voice transcription event is detected during a given session. A language displayed event can be used to track the distribution and localization of language. This event allows an AR experience developer to localize text in the AR experience which will automatically use the correct localized string.

Any other custom or predefined event or trigger type can be selected by an AR experience developer to be separately tracked and used to accumulate or generate metrics for a given AR experience.

A client application 104 is able to communicate and exchange data with other messaging clients 104 and with the messaging server system 108 via the network 112. The data exchanged between client applications 104, and between a client application 104 and the messaging server system 108, includes functions (e.g., commands to invoke functions) as well as payload data (e.g., text, audio, video or other multimedia data).

The messaging server system 108 provides server-side functionality via the network 112 to a particular client application 104. While certain functions of the messaging system 100 are described herein as being performed by either a client application 104 or by the messaging server system 108, the location of certain functionality either within the client application 104 or the messaging server system 108 may be a design choice. For example, it may be technically preferable to initially deploy certain technology and functionality within the messaging server system 108 but to later migrate this technology and functionality to the client application 104 where a client device 102 has sufficient processing capacity.

The messaging server system 108 supports various services and operations that are provided to the client application 104. Such operations include transmitting data to, receiving data from, and processing data generated by the client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the client application 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the client application 104 in order to invoke functionality of the application servers 114. The API server 116 exposes various functions supported by the application servers 114, including account registration, login functionality, the sending of messages, via the application servers 114, from a particular client application 104 to another client application 104, the sending of media files (e.g., images or video) from a client application 104 to a messaging server 118, and for possible access by another client application 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the client application 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available to the client application 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
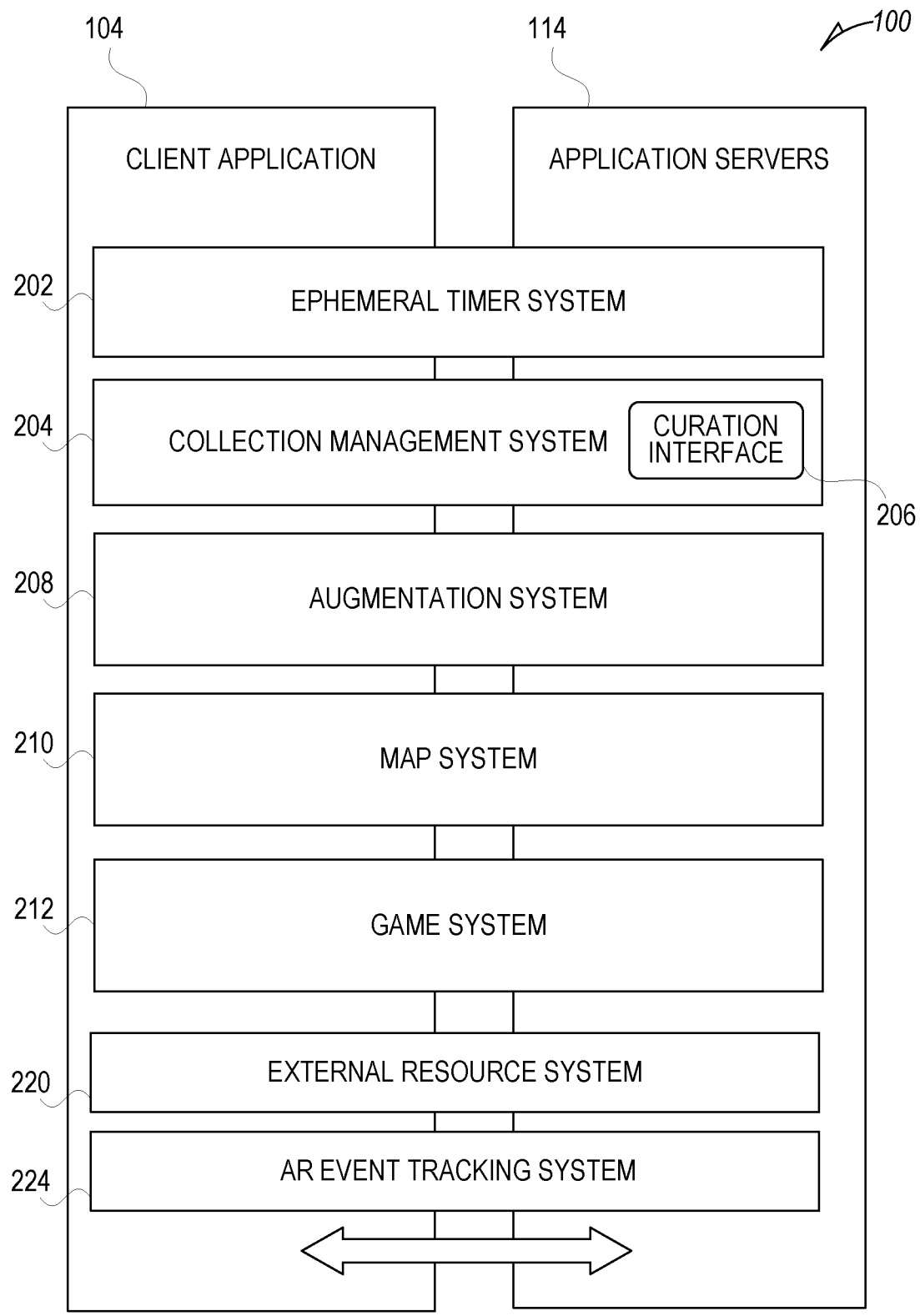
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the client application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
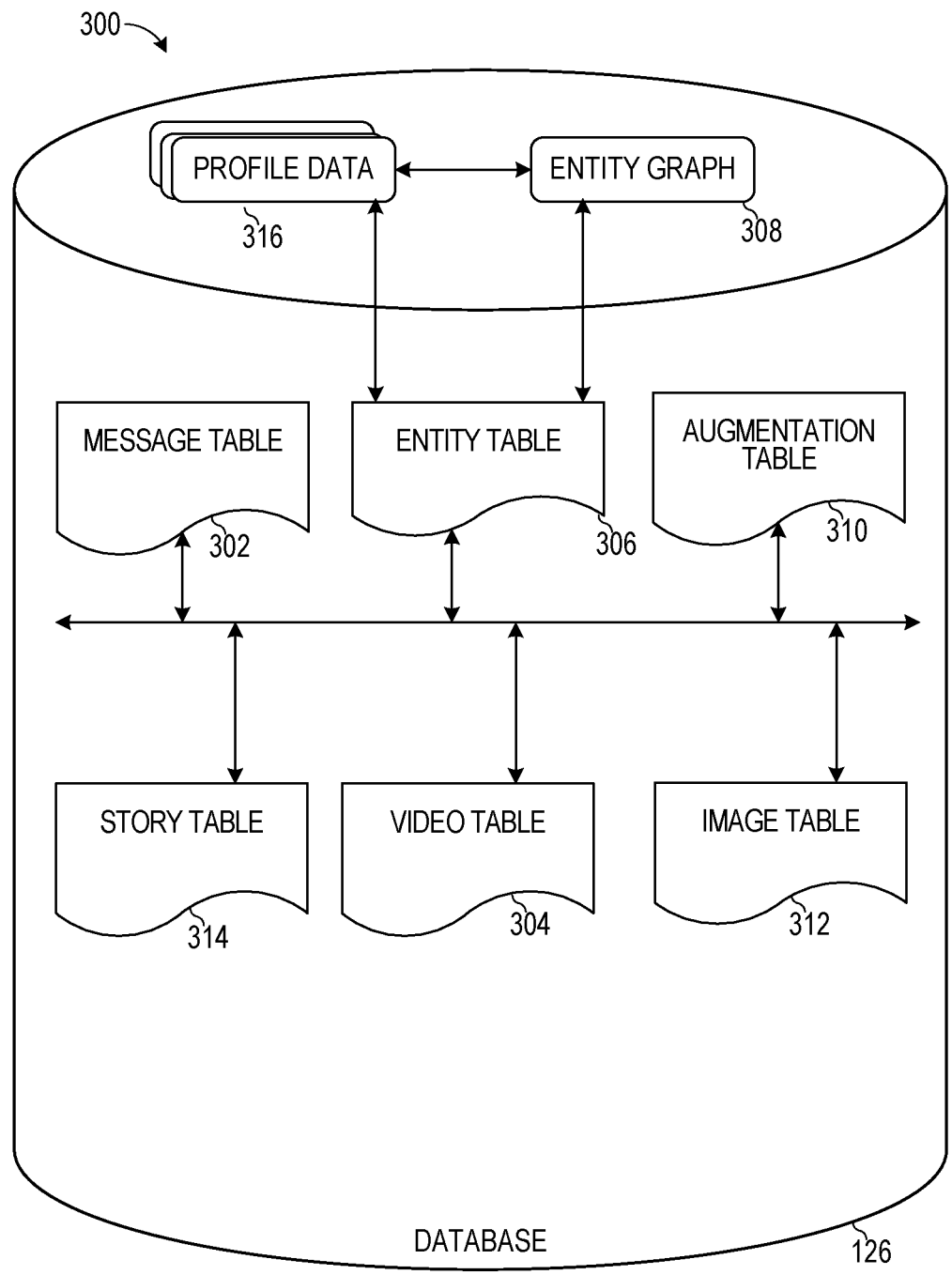
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the client application 104, features and functions of an external resource (e.g., a third-party application 109 or applet) are made available to a user via an interface of the client application 104. The client application 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the client application 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the client application 104 determines whether the selected external resource is a web-based external resource or a locally-installed external application. In some cases, external applications 109 that are locally installed on the client device 102 can be launched independently of and separately from the client application 104, such as by selecting an icon, corresponding to the external application 109, on a home screen of the client device 102. Small-scale versions of such external applications can be launched or accessed via the client application 104 and, in some examples, no or limited portions of the small-scale external application can be accessed outside of the client application 104. The small-scale external application can be launched by the client application 104 receiving, from an external app(s) server 110, a markup-language document associated with the small-scale external application and processing such a document.

In response to determining that the external resource is a locally-installed external application 109, the client application 104 instructs the client device 102 to launch the external application 109 by executing locally-stored code corresponding to the external application 109. In response to determining that the external resource is a web-based resource, the client application 104 communicates with the external app(s) servers 110 to obtain a markup-language document corresponding to the selected resource. The client application 104 then processes the obtained markup-language document to present the web-based external resource within a user interface of the client application 104.

The client application 104 can notify a user of the client device 102, or other users related to such a user (e.g., "friends"), of activity taking place in one or more external resources. For example, the client application 104 can provide participants in a conversation (e.g., a chat session) in the client application 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective client application 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the client application 104. The external resource can selectively include different media items in the responses, based on a current context of the external resource.

The client application 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The client application 104 can allow users to launch AR experiences with AR elements or events of different types. Specifically, the client application 104 can receive a request to access an AR experience. In response to receiving the request to access the AR experience, the client application 104 launches an AR experience bundle associated with the AR experience. As part of the AR experience bundle, the client application 104 accesses a list of event types associated with the AR experience used to generate one or more metrics. The list can include event types that are predefined and/or event types that are specifically configured and selected by the AR developer and/or event types that are automatically added for tracking when certain AR components are added to the AR experience bundle.

The client application 104 can determine that an interaction associated with the AR experience corresponds to a first event type of the list of event types. The client application 104 can generate interaction data for the first event type representing the interaction and receive a request to terminate the AR experience. The client application 104, in response to receiving the request to terminate the AR experience, can transmit the interaction data to a remote server. The remote server can collect this interaction data from many client devices 102 and generate feature specific metrics for the AR experience. The remote server can present the feature specific metrics to the AR experience developer. This can allow the AR experience developer to enhance or improve certain features of the AR experience which can improve the overall experience of end users. The list of interactions associated with the AR experience may be defined by the AR developer, such that each AR experience can have a unique list of interactions that can be tracked. Such interactions can correspond to different events that are tracked for each AR experience based on the AR developer specified configuration.

In some examples, the client application 104 can present an AR developer interface. In such cases, the client application 104 can be operated by an AR developer to develop and create one or more AR experiences, as discussed below.

System Architecture

FIG. 2 is a block diagram illustrating further details regarding the messaging system 100, according to some examples. Specifically, the messaging system 100 is shown to comprise the client application 104 and the application servers 114. The messaging system 100 embodies a number of subsystems, which are supported on the client side by the client application 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the client application 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the client application 104 based on a geolocation of the client device 102. In another example, the augmentation system 208 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the client application 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the client application 104. A user can furthermore share his or her location and status information (e.g., using an appropriate status avatar) with other users of the messaging system 100 via the client application 104, with this location and status information being similarly displayed within the context of a map interface of the client application 104 to selected users.

The game system 212 provides various gaming functions within the context of the client application 104. The client application 104 provides a game interface providing a list of available games (e.g., web-based games or web-based applications) that can be launched by a user within the context of the client application 104, and played with other users of the messaging system 100. The messaging system 100 further enables a particular user to invite other users to participate in the play of a specific game, by issuing invitations to such other users from the client application 104. The client application 104 also supports both voice and text messaging (e.g., chats) within the context of gameplay, provides a leaderboard for the games, and also supports the provision of in-game rewards (e.g., coins and items).

The external resource system 220 provides an interface for the client application 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the client application 104). The client application 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the client application 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the client application 104 into the web-based resource.

The SDK stored on the messaging server 118 effectively provides the bridge between an external resource (e.g., third-party or external applications 109 or applets and the client application 104). This provides the user with a seamless experience of communicating with other users on the client application 104, while also preserving the look and feel of the client application 104. To bridge communications between an external resource and a client application 104, in certain examples, the SDK facilitates communication between external resource servers 110 and the client application 104. In certain examples, a WebViewJavaScript-Bridge running on a client device 102 establishes two one-way communication channels between an external resource and the client application 104. Messages are sent between the external resource and the client application 104 via these communication channels asynchronously. Each SDK function invocation is sent as a message and callback. Each SDK function is implemented by constructing a unique callback identifier and sending a message with that callback identifier.

By using the SDK, not all information from the client application 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the client application 104. Once the user selects the visual representation or instructs the client application 104 through a GUI of the client application 104 to access features of the web-based external resource, the client application 104 obtains the HTML5 file and instantiates the resources necessary to access the features of the web-based external resource.

The client application 104 presents a graphical user interface (e.g., a landing page or title screen) for an external resource. During, before, or after presenting the landing page or title screen, the client application 104 determines whether the launched external resource has been previously authorized to access user data of the client application 104. In response to determining that the launched external resource has been previously authorized to access user data of the client application 104, the client application 104 presents another graphical user interface of the external resource that includes functions and features of the external resource. In response to determining that the launched external resource has not been previously authorized to access user data of the client application 104, after a threshold period of time (e.g., 3 seconds) of displaying the landing page or title screen of the external resource, the client application 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the client application 104 adds the external resource to a list of authorized external resources and allows the external resource to access user data from the client application 104. In some examples, the external resource is authorized by the client application 104 to access the user data in accordance with an OAuth 2 framework.

The client application 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR event tracking system 224 can receive a request to access an AR experience and can access a list of event types associated with the AR experience used to generate one or more metrics from the AR experience bundle associated with the AR experience. The AR event tracking system 224 can determine that an interaction associated with the AR experience corresponds to a first event type of the list of event types. The AR event tracking system 224 can generate interaction data for the first event type representing the interaction and receive a request to terminate the AR experience. The AR event tracking system 224, in response to receiving the request to terminate the AR experience, can transmit the interaction data to a remote server. The AR event tracking system 224 can collect this interaction data from many client devices 102 and generate feature specific metrics for the AR experience. The AR event tracking system 224 can present the feature specific metrics to the AR experience developer. This can allow the AR experience developer to enhance or improve certain features of the AR experience which can improve the overall experience of end users.

The AR event tracking system 224 can allow AR developers to create AR experiences with AR event types or trigger types that are tracked. The AR types that can be tracked can include any combination of a custom event, a face found event, a face lost event, an object tracking criterion, a 3D object tracking criterion, a marker tracking component, a tap event, a touch started event, a touch moved event, a touch ended event, a shared session event, a shared session joined event, a voice command event, a voice transcription event, and/or a language event. The AR event tracking system 224 can present a user interface of an AR developer platform. The user interface can be used to select which AR events are to be tracked and collected after the AR experience is terminated or closed. The user interface can be used to select which AR components to include or program into the AR experience bundle in order to automatically generate a custom list of events to be tracked and collected after the AR experience is terminated or closed.

In some examples, the graphical user interface presents a list of AR events associated with the AR experience and includes a first option associated with a first AR event of the list of AR elements to cause tracking of the first AR event to be collected and transmitted or stored after termination of the AR experience in response to selection of the first option. The user interface also includes a second option associated with the first AR event to specify conditions under which the first AR event is tracked. The user interface also includes a third option for specifying a custom name for the first event type that is tracked which can be used to generate a graph, plot or other representation of the metrics collected for the event. In some examples, the user interface only includes an option to specify a custom name for an event to track and provides an option to link to Javascript code that defines parameters of the event or trigger of the event. In some cases, the graphical user interface allows the AR developer to add AR components to the AR experience and the AR development platform automatically adds or generates events or triggers for the added AR components for tracking interactions.

This functionality provides a greater amount of flexibility for a developer to create useful, interesting and engaging AR experiences without being restricted by the resource constraints of the messaging applications and/or client devices that run the AR experiences. Specifically, each AR developer can uniquely configure what event metrics are tracked for each of their separate AR experiences, including any predetermined events provided by the system and unique events that the AR developer would like to track.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
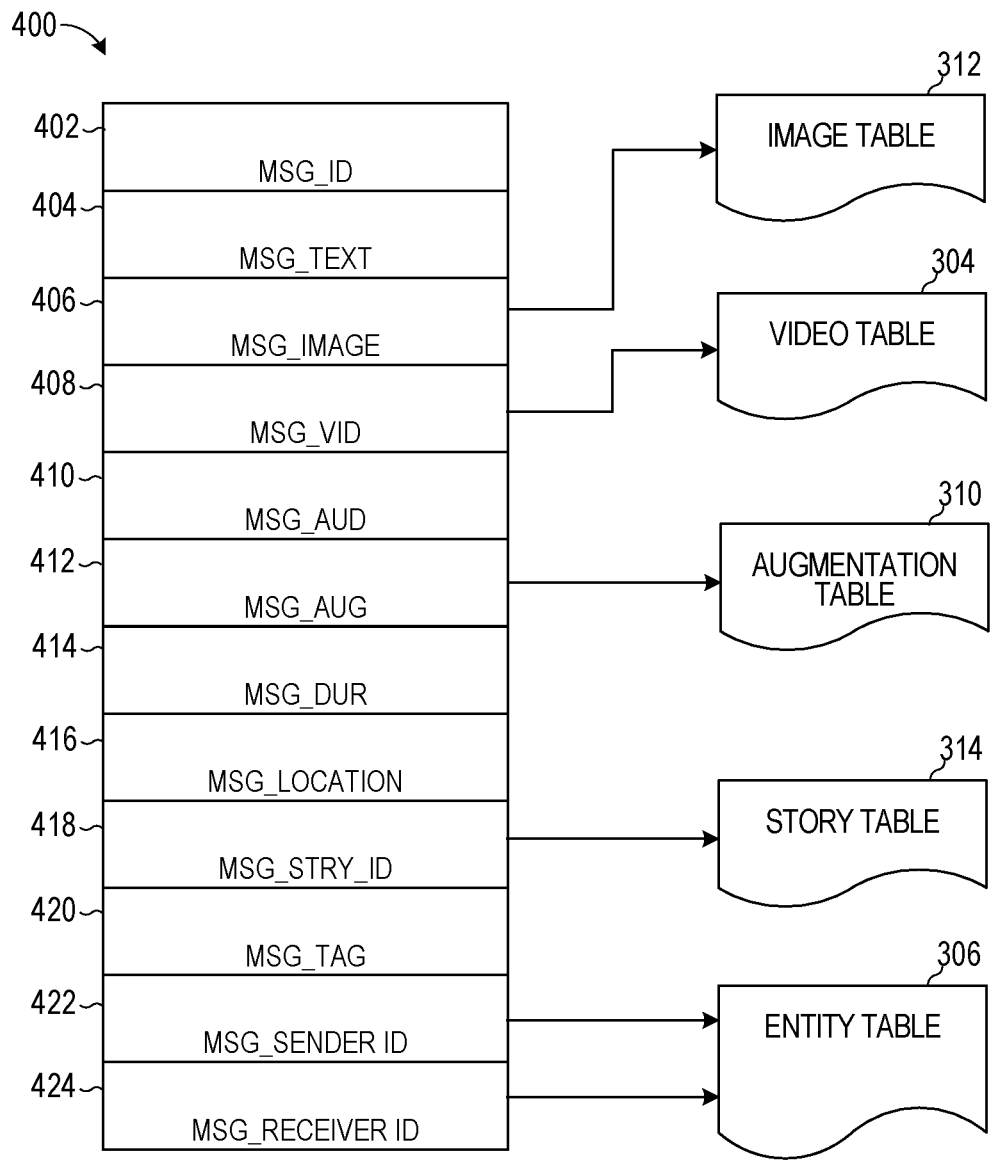
FIG. 4 is a diagrammatic representation of a message, in accordance with some examples.

FIG. 4 is a schematic diagram illustrating a structure of a message 400, according to some examples, generated by a client application 104 for communication to a further client application 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the client application 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Event Tracking System

Figure 5:
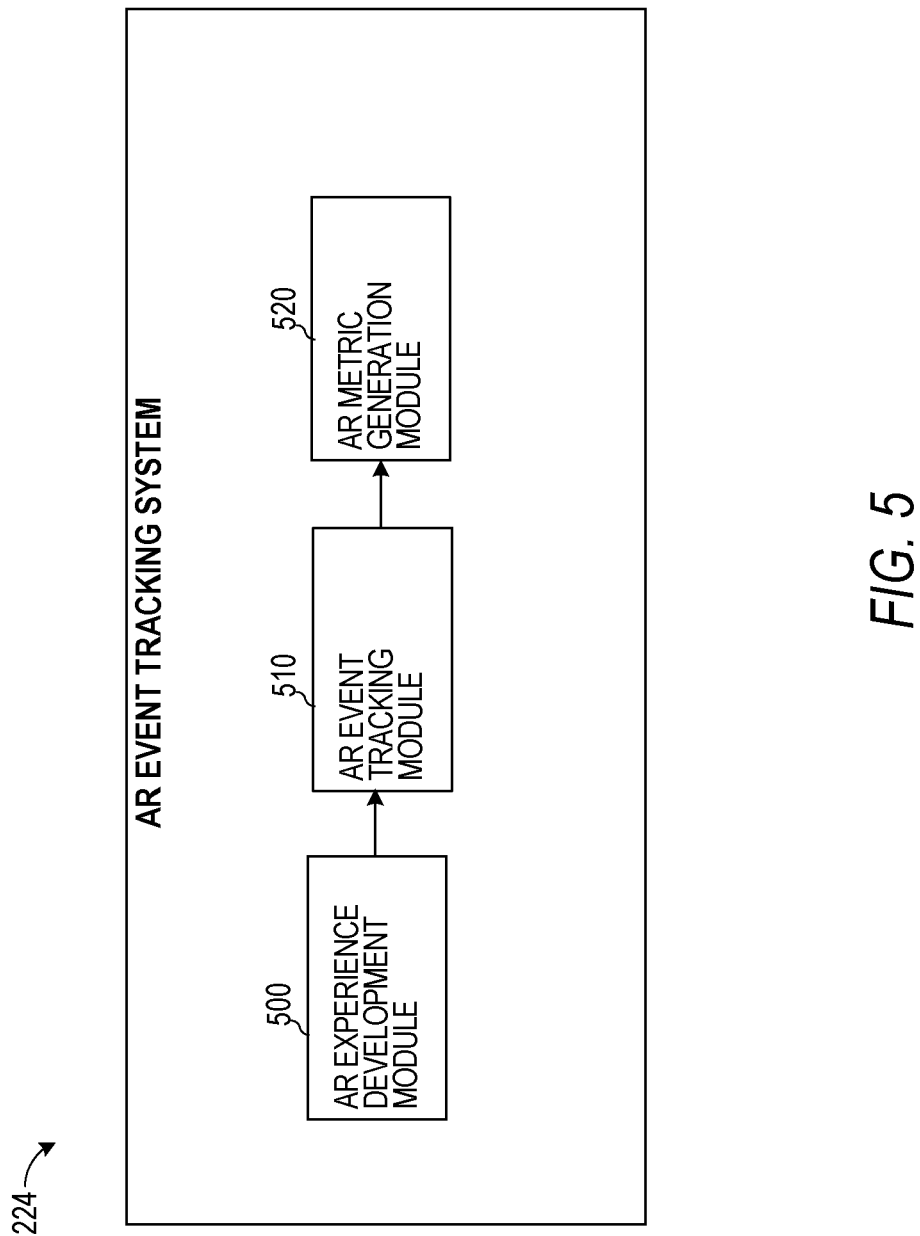
FIG. 5 is a block diagram showing an example AR event tracking system, according to some examples.

FIG. 5 is a block diagram showing an example AR event tracking system 224, according to some examples. The AR event tracking system 224 includes an AR experience development module 500, an AR event tracking module 510, and an AR metric generation module 520.

The AR experience development module 500 can generate user interfaces for presentation to an AR developer on an AR developer client device 102. The user interfaces can enable the AR developer to select AR events to track on an AR experience launched on one or more client devices 102. In some examples, the user interface enable the AR developer to add AR components and AR events associated with the AR components are automatically added for tracking interactions. This way, the AR developer does not need to manually define and program code for tracking interactions with the added AR components. The user interfaces enable AR developers to define unique event tracking for each of their AR experiences, such as by providing Javascript code that defines the manner and process of tracking the event, such as the conditions for triggering tracking and counting. The event tracking can correspond to predefined events or custom events generated by the AR developer. In this way, one AR experience can be associated with a first list of AR event types that are tracked which are the same or different from a second list of AR event types that are tracked for a second AR experience. This allows the AR developers to have greater control of which types of events are tracked and used to generate metrics and which are not as well as how the events are tracked or triggered.

As referred to herein, an "AR experience bundle" or "AR bundle" represents a set of AR elements (including standard AR elements and linked AR elements) and corresponding code that indicates the visual appearance, interaction and behavior of each of the AR elements. The AR bundle includes the code necessary for a client device 102 to launch and execute the AR experience associated with the AR bundle.

In some examples, the AR experience development module 500 receives a request from a developer client device 102 to access a developer user interface. The AR experience development module 500 can receive login credentials from the developer client device 102. The AR experience development module 500 can search for an account associated with the login credentials and can generate a graphical user interface associated with the account for presentation to the developer client device 102. The AR experience development module 500 can present, in the graphical user interface, a plurality of AR experience bundles associated with the account. In some cases, the account is accessible to an organization, in which case multiple users within the organization can share access to the account and can view the same set of AR experience bundles.

Figure 6:
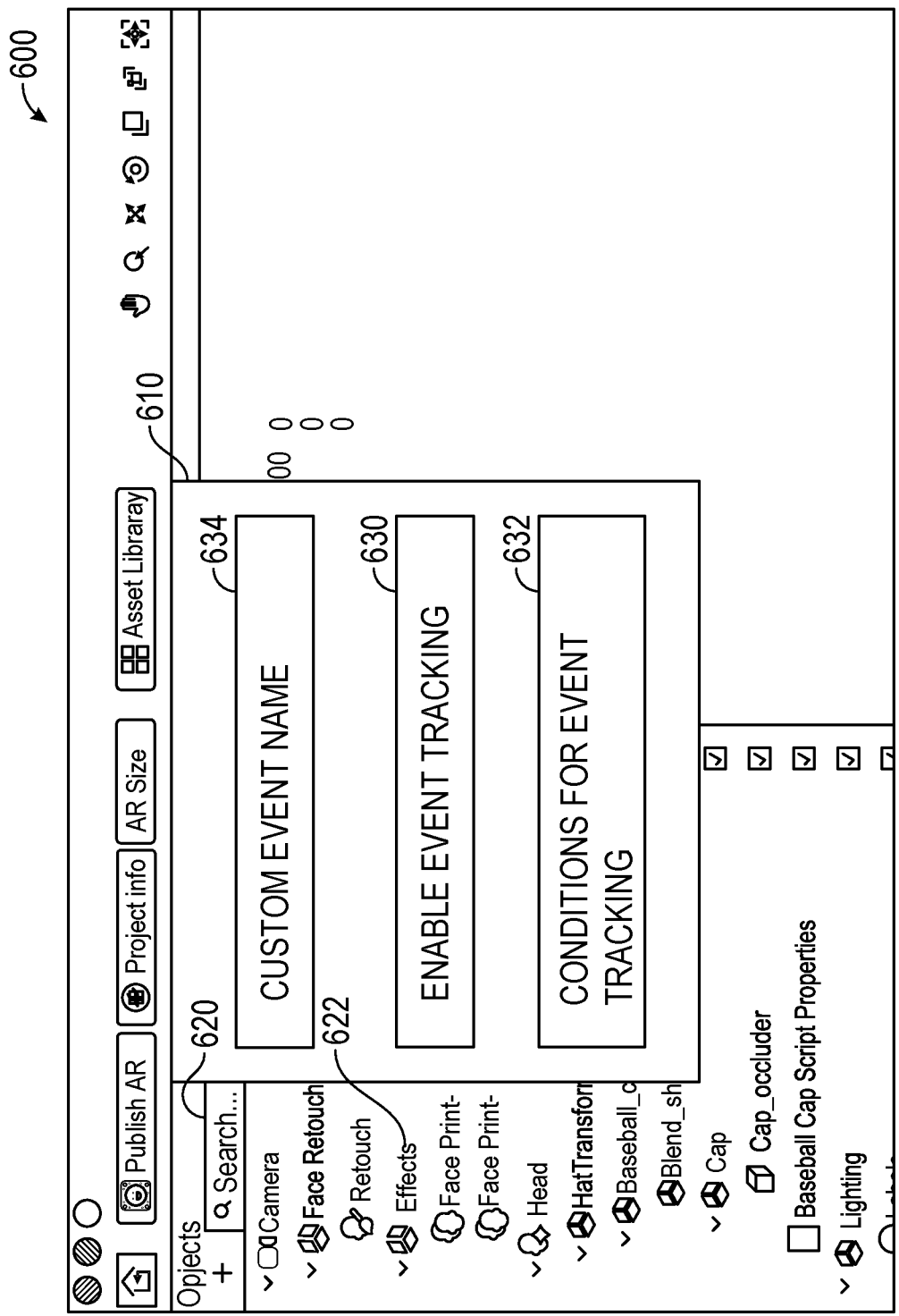
FIGS. 6-8 are diagrammatic representations of outputs of the AR event tracking system, in accordance with some examples.

The AR experience development module 500 can receive input from the developer client device 102 that selects a given AR experience bundle. In response to receiving the input, the AR experience development module 500 can present a graphical user interface 600 (FIG. 6). The AR experience development module 500 can include in the graphical user interface 600 an identifier of the AR experience bundle and a list of AR events or triggers 620 that are included in the AR experience bundle. In some cases, instead of or in addition to presenting the list of AR events or triggers, the graphical user interface 600 lists AR components that are available to be added or that are already added in the AR experience bundle. For each or a portion of the AR components that are included in the AR experience bundle, a set of events or triggers are automatically added for tracking interactions. In some cases, the graphical user interface 600 provides an option to specify a custom name for an event to track. The graphical user interface 600 can allow the AR developer to input a custom name and link Javascript code that defines the operations and conditions for tracking interactions with the AR experience in association with the custom name.

An AR event or trigger can include or represent a specified action or object that is associated with the AR experience. For example, the AR event or trigger can include any combination of a custom event, a camera event (specifying activation of a front or rear facing camera), a face found event, a face lost event, an object tracking criterion, a 3D object tracking criterion, a marker tracking component, a tap event, a touch started event, a touch moved event, a touch ended event, a shared session event, a shared session joined event, a voice command event, a voice transcription event, and/or a language event. The list can also include one or more AR elements or objects. The AR elements can include 2D meshes, 3D meshes, videos, audio files, image files, and/or machine learning models.

The AR experience development module 500 can also present in the graphical user interface 600 an option (not shown) to access or view metrics associated with a selected AR experience bundle. In response to receiving a selection of this option, the AR experience development module 500 can communicate with the AR metric generation module 520 to obtain one or more metrics associated with the AR experience. The AR experience development module 500 can then generate a user interface that includes a graph or plot representing the one or more metrics. An example graph or plot is depicted in the example graphical user interface 800 shown in FIG. 8 and discussed below.

The AR experience development module 500 can receive input that selects a given AR event 622 or an AR component from the list of AR events or triggers 620. In response, the AR experience development module 500 presents a prompt 610 that lists the options for generating metrics associated with the given AR event 622. The list of options can include a custom event name option 634, an enable event tracking option 630, and one or more conditions for event tracking option 632. In some cases, the conditions for event tracking option 632 can be displayed in response to receiving a selection of the enable event tracking option 630. The selection of the enable event tracking option 630 generates a counter in association with the given AR event 622. The counter is incremented each time the given AR event 622 is detected as being performed or satisfied on an end user client device 102. The counter can be client device 102 specific or can be a counter that is associated with many client devices 102. The value of the counter can be used to generate or represent metrics for the AR experience including the AR event 622 in a graphical user interface that depicts a graph or plot. In some cases, each client device 102 provides the accumulated value of the counter and the accumulated values received from multiple client devices 102 are averaged by the server (e.g., the AR metric generation module 520). In some examples, each client device 102 locally computes the average and provides the average of the counters to the AR experience development module 500.

In response to receiving a selection of the enable event tracking option 630, a new field is added to a graph or plot that represents metrics associated with the AR experience. The new field can be represented visually with a name matching a name input in the custom event name option 634. In some cases, in response to adding an AR component that is associated automatically with an event or trigger, a new field is added to a graph or plot that represents metrics associated with the AR experience component.

The prompt 610 can include a conditions for event tracking option 632. In response to receiving a selection of option 632, one or more fields for inputting one or more conditions for triggering counting the event associated with the given event AR event 622 can be presented. For example, the conditions can specify a level of subscription of an end user, a geographical region associated with the end user, a time of day, a type of AR experience, geographical locations, levels in a gaming application or AR experience, views or depictions of real-world environment portions, a request from an end user to enable persisting the AR object or element, time, location markers, image markers, or any other suitable condition. In some examples, the prompt 610 may not be displayed at all and the custom events can be added for tracking automatically in response to certain associated AR components being added, generated or enabled by the AR developer.

To ensure user data privacy, the client device 102 (or application implemented on the client device 102) may notify the user regarding the type of information that may be collected and prompt the user to choose whether to opt-in prior to collecting the data. The system will not collect the data if the user declines to opt-in and does not give consent. If the user opts-in, the data is stored securely in an encrypted manner on the server.

In some examples, the conditions can be the same or different for each event type that is being tracked to generate metrics. For example, a first event 622 can be associated with a first set of conditions (e.g., a certain level of subscription of the end user) and a second event can be associated with a second set of conditions (e.g., a geographical region of the client device 102). The first event 622 causes a counter associated with the first event 622 to be incremented or adjusted when the criterion of the first event is met and when the first set of conditions are satisfied. The second event causes a respective counter associated with the second event to be incremented or adjusted when the criterion of the second event is met and when the second set of conditions are satisfied.

Figure 7:
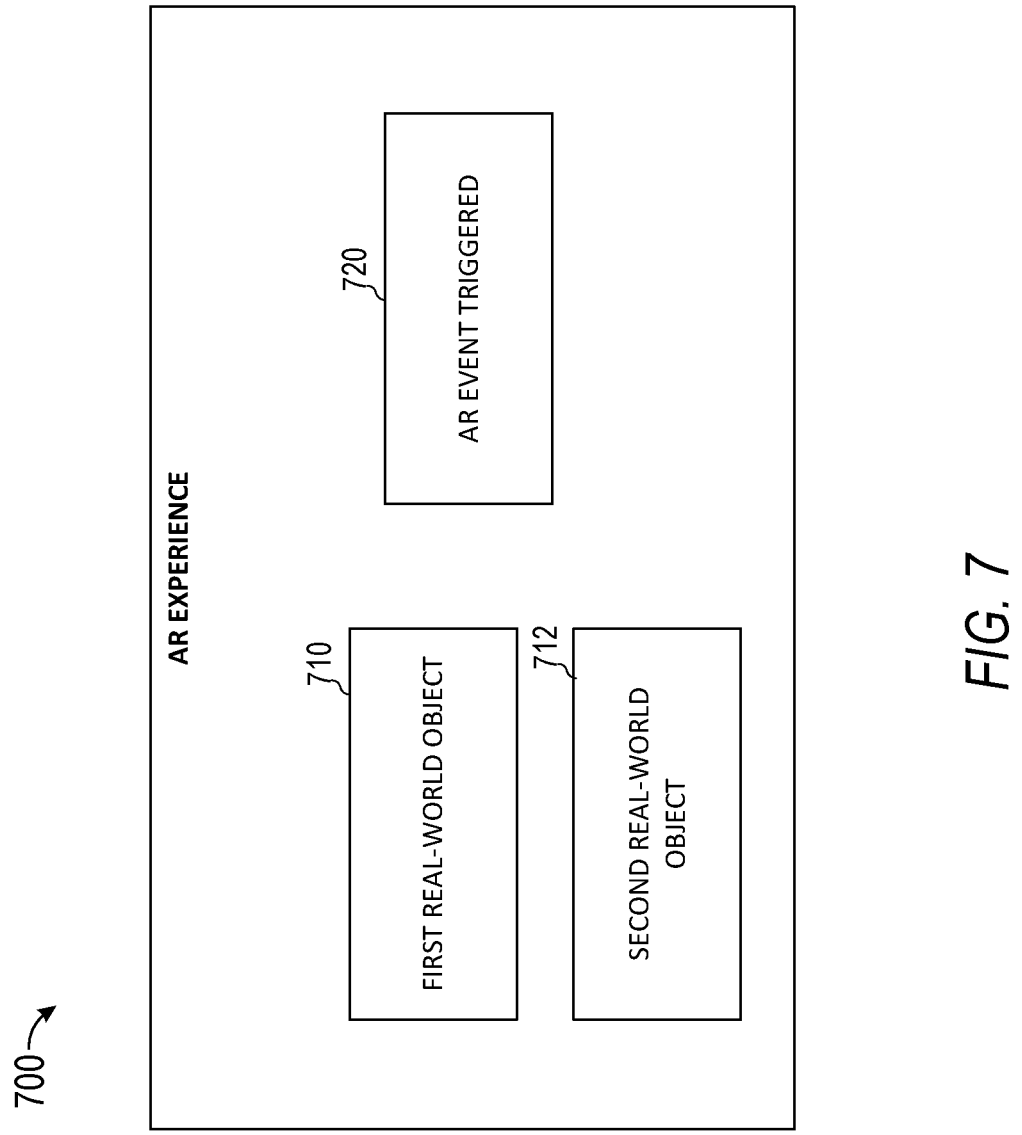

In some examples, the given event 622 can be associated with or represent a face found event. The face found event can be associated with a condition or trigger that is satisfied when a new face (or other designated object) is detected by a camera of a client device 102. For example, the AR experience can be launched by an end user client device 102. In response, a graphical user interface, such as example user interface 700 shown in FIG. 7 is depicted and can include a first real-world object 710 and a second real-world object 712 and one or more AR objects (not shown). The client device 102 can monitor interactions that take place during the AR experience session that is launched on the client device 102. The client device 102 can obtain a list of events including the given event 622 that trigger generation of metrics for the AR experience from the associated AR experience bundle.

In some examples, the client device 102 can determine that a particular interaction (e.g., a face in a camera feed) corresponds to the given event 622 included in the list of events. Namely, the client device 102 can determine that the particular interaction corresponds to a first type of event in the list of event types associated with the AR experience. For example, the given event 622 can be a face found event that is enabled for tracking and generation of metrics. In such cases, the client device 102 can generate interaction data for the face found event to represent the detected interaction. This can be performed by aggregating the interaction into an entity associated with the given event 622. The entity can include a first counter that is instantiated to compute or measure the total number of face found events or the average number of face found events per session (e.g., per time between starting the AR experience and ending the AR experience). In some examples, in response to detecting a face in a camera feed of the client device 102, the client device 102 can determine that the AR event 622 has been triggered and can present an AR event triggered message 720. The client device 102 can also access one or more conditions associated with the given event 622. If the one or more conditions are specified or are satisfied, the client device 102 can increment a value of the first counter each time the face found event is triggered. In some cases, the first counter represents a total number of times the face found event is triggered. In some cases, the first counter represents an average number of times the face found event has been triggered. In some cases, the total number of times is provided to the AR metric generation module 520 by the client device 102 and the AR metric generation module 520 generates the average number of times.

As another example, the given event 622 can in addition or in the alternative be associated with or represent the face lost event. The face lost event can be associated with a condition or trigger that is satisfied when a face (or other designated object) is no longer detected and tracked, such as if the face gets blocked from the camera's view or is too far away. In such cases, a second entity associated with the face lost event can be used to track this particular type of event. For example, a second counter can be started to compute or measure the total number of times the face lost events per session or the average number of faces lost in a session. In some cases, the second counter represents a total number of times the face found event is triggered. In some cases, the second counter represents an average number of times the face found event has been triggered. In some cases, the first counter represents a total number and the second counter represents an average of the associated event type. In some cases, the total number of times is provided to the AR metric generation module 520 by the client device 102 and the AR metric generation module 520 generates the average number of times.

In some examples, the client device 102 can determine that a particular interaction (e.g., a particular camera view, such as a front-facing camera view, a rear-facing camera view, or that a specified real-world object is detected in a captured image) corresponds to the given event 622 included in the list of events. Namely, the client device 102 can determine that the particular interaction corresponds to a given type of event in the list of event types associated with the AR experience corresponding to a particular camera view. For example, the given event 622 can be a camera view event that is enabled for tracking and generation of metrics, such as to represent the number of times a front-facing camera view is activated, a rear-facing camera view is activated, or that a specified real-world object is detected in a captured image. In such cases, the client device 102 can generate interaction data for the camera view event to represent the detected interaction. This can be performed by aggregating the interaction into an entity associated with the given event 622. The entity can include a particular counter that is instantiated to compute or measure the total or average number of times a front-facing camera view is activated, a rear-facing camera view is activated, or that a specified real-world object is detected in a captured image. The client device 102 can also access one or more conditions associated with the given event 622. If the one or more conditions are specified or are satisfied, the client device 102 can increment a value of the particular counter each time the camera view event is triggered. In some cases, the total number of times is provided to the AR metric generation module 520 by the client device 102 and the AR metric generation module 520 generates the average number of times.

The client device 102 can determine that the AR experience has been terminated. In response, the client device 102 can generate a message that includes any of the entities associated with the tracked event types. For example, the client device 102 can generate metrics or counters for each of the events that are being tracked. The message is then sent from the client device 102 to the AR event tracking module 510. The AR event tracking module 510 can receive similar messages from many other client devices 102 that launch the same AR experience and can aggregate the respective entities or counters to generate the metrics for each event type that is being tracked.

For example, the AR event tracking module 510 can receive a first value for the first counter associated with the face found event from a first end user client device 102 and can receive a second value for the first counter from a second end user client device 102. The AR event tracking module 510 can combine or sum the first and second values to generate a metric for the first counter representing the face found event for the AR experience. In some examples, the AR event tracking module 510 can compute an average of the first and second values to generate a metric for the first counter representing the face found event for the AR experience. The AR event tracking module 510 stores the metric in association with the AR experience and provides this metric to the AR metric generation module 520. In some examples, the AR event tracking module 510 provides the raw total values for the first and second values to the AR metric generation module 520 which then computes the average.

In some examples, a given event 622 includes or represents an object tracking criterion associated with a condition or trigger that is satisfied when an object is currently tracked by a camera of a client device 102 of an end user. A third counter can be used to count the total number or average number of times the object is tracked in given session. In some examples, a separate 3D object tracking criterion can be used to separately track the number of 3D objects that are tracked by a camera of the client device 102. In some examples, a marker tracking criterion can be associated with a condition or trigger that is satisfied when a marker image is currently tracked by a camera. A fourth counter can be used to count the total or average number of times the marker image is tracked. In some cases, the total number of times is provided to the AR metric generation module 520 by the client device 102 and the AR metric generation module 520 generates the average number of times.

In some examples, a tap event is associated with a condition or trigger that is satisfied when a touch input is detected by the client device 102. A fifth counter can be used to count the total number or average number of times the touch input is detected during a given session. A similar condition or trigger can be used to track the number of times a user starts touching a screen, or when the user moves a finger while holding a screen touch (dragging on the screen), and/or when the user ends a screen touch (e.g., by lifting the finger from the screen).

In some examples, a shared or multi-user AR shared session is associated with a condition or trigger that is satisfied when a shared AR session is shared with another user. A sixth counter can be used to count the total number or average number of times the AR session was shared with other users. A similar condition or trigger can be used to track the number of times the shared AR session was joined by other users.

In some examples, a voice command event is associated with a condition or trigger that is satisfied when a voice navigation command (e.g., using natural language processing) is detected by the client device 102. A seventh counter can be used to count the total number or average number of times the voice command event is detected during a given session. A voice transcription event is associated with a condition or trigger that is satisfied when a speech is transcribed in real time during recording or for a stored video clip. An eighth counter can be used to count the total number or average number of times the voice transcription event is detected during a given session. A language displayed event can be used to track the distribution and localization of language. This event allows an AR experience developer to localize text in the AR experience which will automatically use the correct localized string. In some cases, the total number of times is provided to the AR metric generation module 520 by the client device 102 and the AR metric generation module 520 generates the average number of times.

Any other custom or predefined event or trigger type can be selected by an AR experience developer to be separately tracked and used to accumulate or generate metrics for a given AR experience. Similar to the first and second counters (discussed above), any of or all of these additional counters can be added to the message that is transmitted to the remote server in response to terminating the AR experience on the client device 102. The remote server (e.g., the AR event tracking module 510) applies one or more statistical functions (e.g., averages) to each particular counter received from one or more client devices 102 to generate the metrics for the AR experience.

In some examples, the AR event tracking module 510 can generate a list of generic events that can be tracked (e.g., using entities or counters) on respective client devices 102. The AR event tracking module 510 can receive input from a developer that specifies a custom event name via the option 634. In response, the AR event tracking module 510 can search the generic events for triggers that match the conditions and attributes of the given event 622. In response to determining that a particular generic event includes conditions and attributes that match the attributes of the given event 622, the AR event tracking module 510 generates a map that stores an association between the custom event name and the particular generic event. The AR event tracking module 510 can instruct a client device 102 to track occurrences of the particular generic event while an AR experience is launched. The client device 102 can provide the entity or counters associated with the particular generic event triggered by the AR experience after the AR experience is terminated. The AR event tracking module 510 can search the map to identify the custom event name associated with the particular generic event. The AR event tracking module 510 can then store the tracked occurrences of the particular generic event as part of the interaction data of the given event 622 corresponding to the custom event name.

Figure 8:
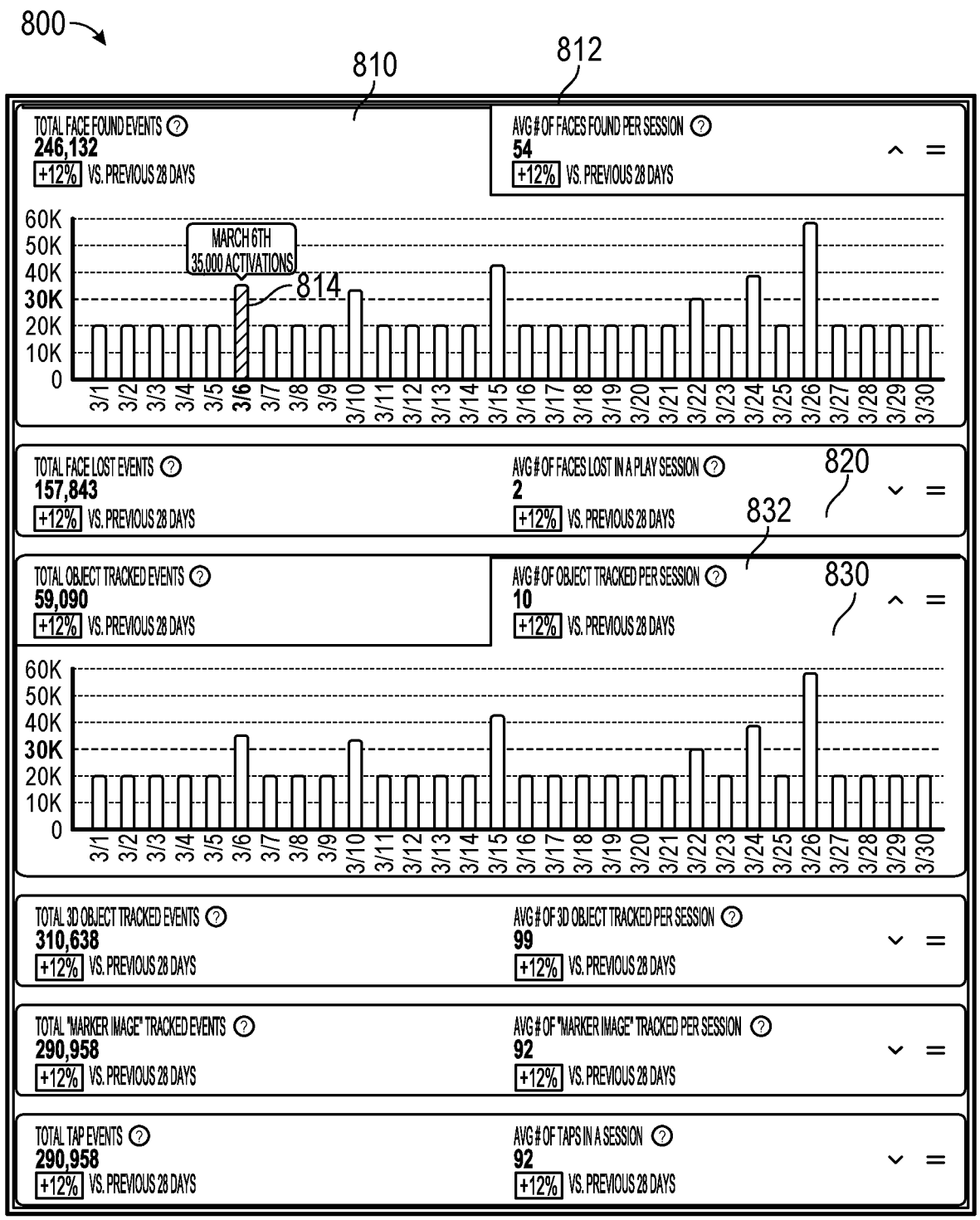

The developer client device 102 presents a user interface, such as the example user interface 800 of FIG. 8 that represents metrics corresponding to one or more interactions or event types detected across one or more client devices 102 while a given AR experience was launched. The user interface 800 is generated by the AR metric generation module 520 based on entities received from one or more client devices 102 representing interactions that took place while the AR experience was launched. The interactions can represent occurrences of one or more event types that have been previously enabled for tracking by a developer.

In some examples, the user interface 800 includes a list of each type of event that was previously enabled by the developer for tracking (e.g., by selection of option 630). The user interface 800 can receive a selection from the developer of a first region 820. The first region 820 can be associated with a first type of event that is tracked. For example, the first region 820 can be associated with the face found event. In response to receiving the selection of the first region 820, the AR metric generation module 520 presents a first graph or plot 810 that indicates the counter values or entity values on a daily basis received from one or more client devices 102. The counter values can represent a total number of occurrences of the face found event on each particular day 814. The AR metric generation module 520 can receive a user selection of the average number region 812. In response, the AR metric generation module 520 can replace the first graph or plot 810 with a different graph or plot that represents the average number of times (or some other statistical representation) that the face found event was detected on each particular day. Each region can represent the raw counter value (e.g., the total number of times the particular event type was triggered in a given time period, such as 28 days and/or the average number of times the particular event type was triggered in a given time period, such as 28 days).

The user interface 800 can receive a selection of a second event type 830. The second event type can be associated with an object tracking event. In response to receiving the selection of the second event type 830, the AR metric generation module 520 presents a second graph or plot 832 that indicates the counter values or entity values on a daily basis received from one or more client devices 102. The counter values can represent a total number of occurrences of the object tracked event on each particular day. Each region of the second event type 830 can represent the raw counter value (e.g., the total number of times the particular event type was triggered in a given time period, such as 28 days and/or the average number of times the particular event type was triggered in a given time period, such as 28 days). The first and second graphs or plots 810 and 832 can be presented simultaneously to enable the developer to seamlessly and easily compare the interaction data of different event types. As additional event types are selected in the user interface 800, the corresponding entity or counter values are retrieved and a display region is expanded to present a graph or plot representing the counter values.

In this way, the user interface 800 can enable a developer to track usage and interaction data across different custom event types selected by the developer. This allows the developer to monitor and track interactions with different features of the AR experience.

Figure 9:
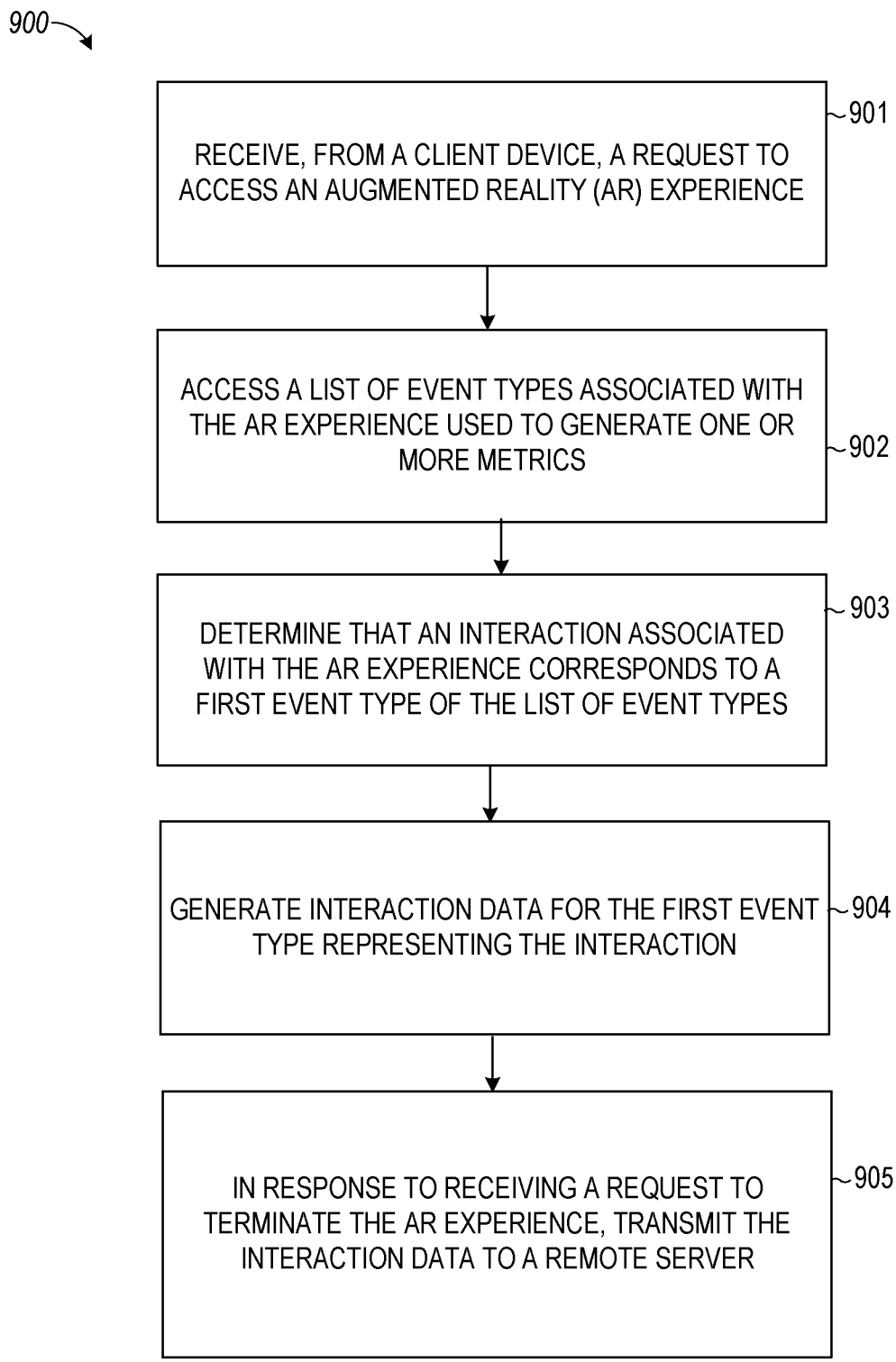
FIG. 9 is a flowchart illustrating example operations of the AR event tracking system, according to some examples.

FIG. 9 is a flowchart of a process 900 performed by the AR event tracking system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the AR event tracking system 224 (e.g., a client device 102 or a server) receives, from a client device, a request to access an AR experience, as discussed above.

At operation 902, the AR event tracking system 224 accesses a list of event types associated with the AR experience used to generate one or more metrics, as discussed above.

At operation 903, the AR event tracking system 224 determines that an interaction associated with the AR experience corresponds to a first event type of the list of event types, as discussed above.

At operation 904, the AR event tracking system 224 generates interaction data for the first event type representing the interaction, as discussed above.

At operation 905, the AR event tracking system 224, in response to receiving a request to terminate the AR experience, transmits the interaction data to a remote server, as discussed above.

Machine Architecture

Figure 10:
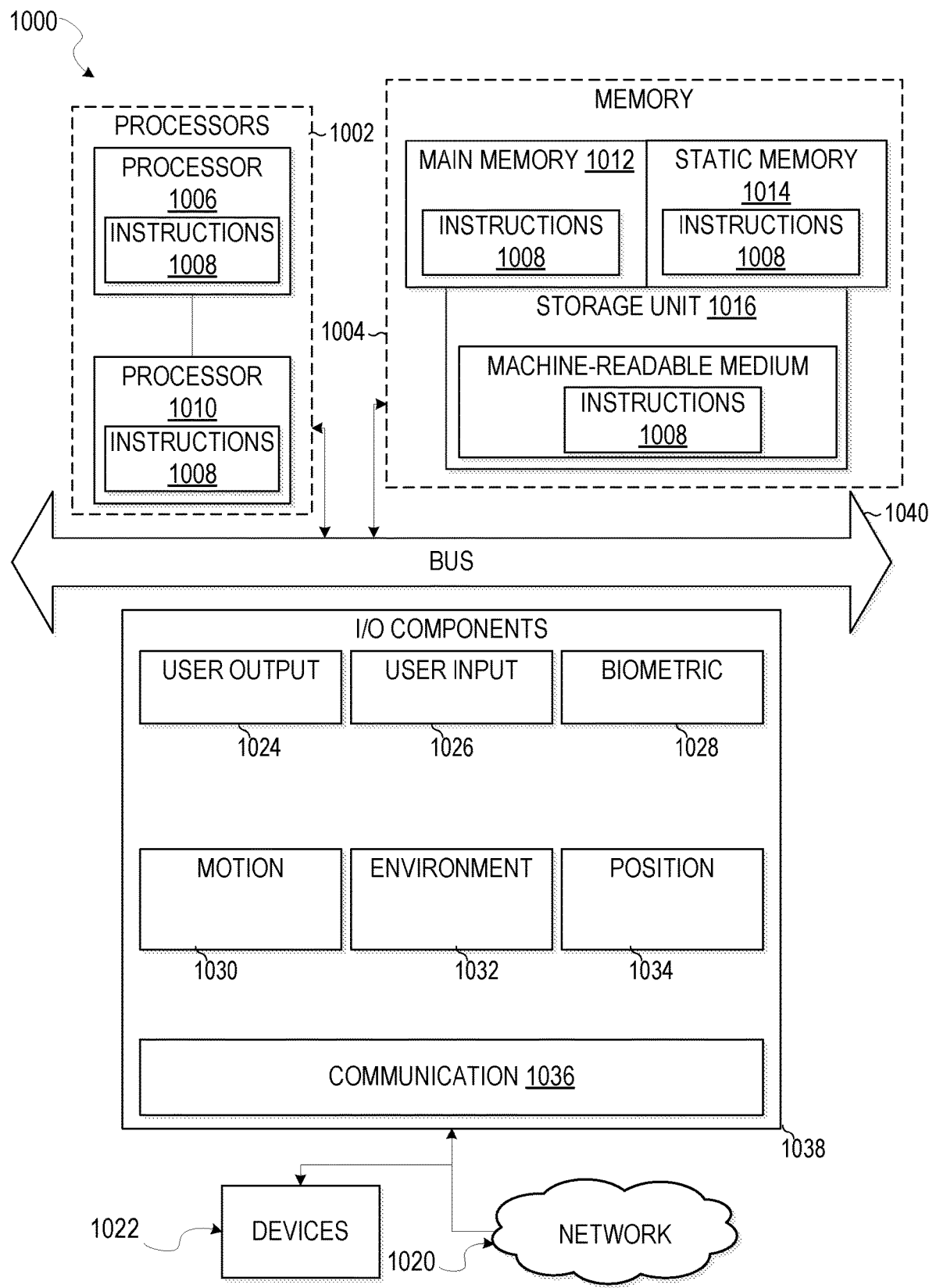
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
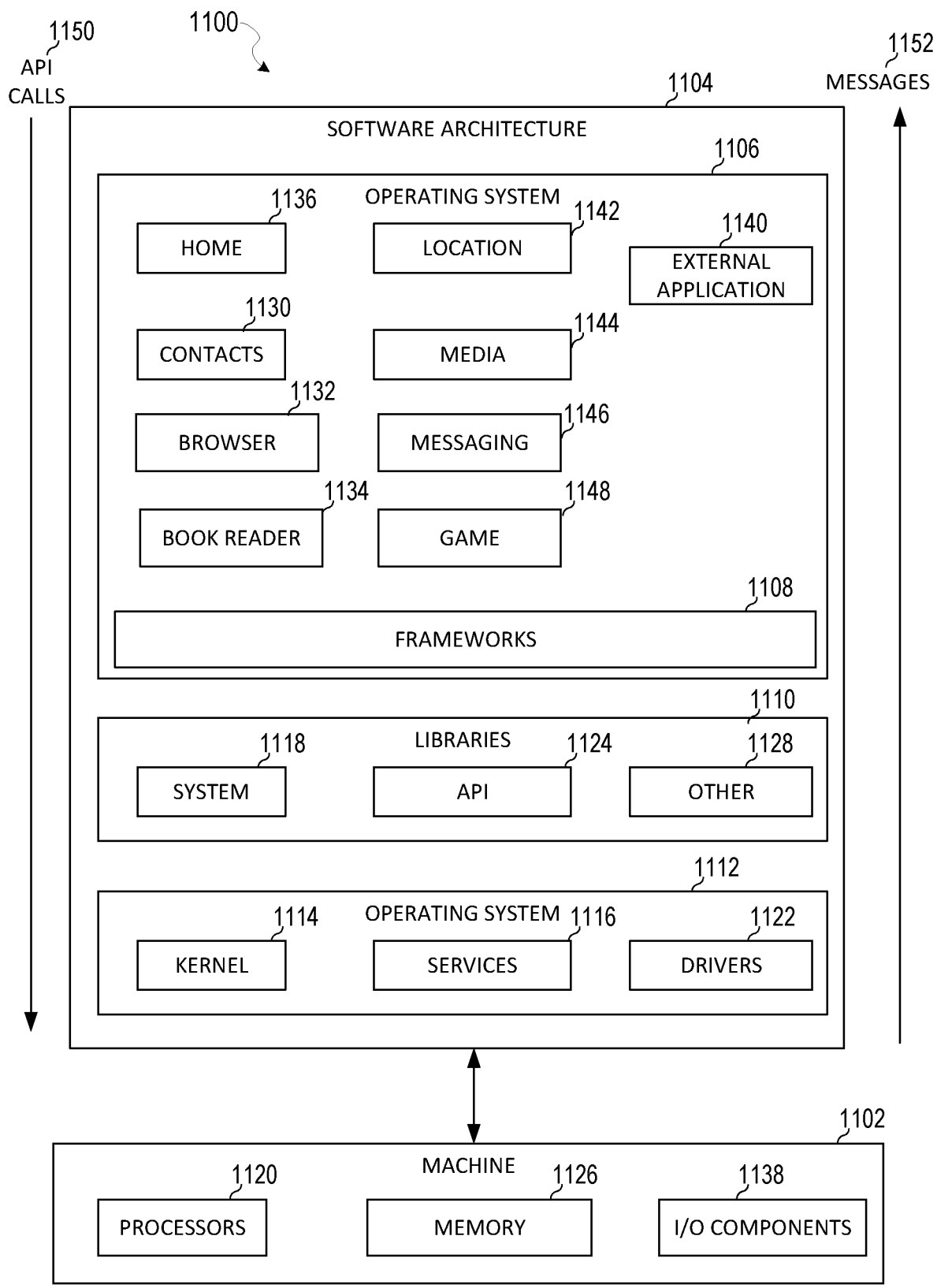
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
presenting, on an augmented reality (AR) developer platform, a graphical user interface for developing an AR experience;
displaying on the graphical user interface a list of different AR events;
receiving input that selects an individual event from the list of different AR events;
in response to receiving the input that selects the individual event, displaying, on the graphical user interface of the AR developer platform, a prompt that comprises a plurality of options for generating metrics associated with the individual event;
receiving input that selects a first option of the plurality of options to enable tracking of the individual event on a user device;
in response to receiving the input that selects the first option of the plurality of options from the graphical user interface to enable tracking of the individual event on the user device, presenting in the graphical user interface a second option associated with defining one or more conditions for triggering the tracking of the individual event;
receiving input via the graphical user interface that selects the second option to define the one or more conditions for triggering the tracking of the individual event; and
storing instructions for generating interaction data based on the first and second options.

2. The method of claim 1, further comprising:
receiving, by the user device, a request to close the AR experience; and
in response to the user device on which the AR experience is being accessed receiving the request to close the AR experience, transmitting, by the user device, interaction data to a remote server.

3. The method of claim 1, further comprising:
aggregating interaction data into an entity associated with a first event type in response to determining that the interaction data corresponds to the first event type; and
storing the entity as part of interaction data.

4. The method of claim 3, wherein aggregating the interaction data comprises accumulating the interaction data with one or more prior interactions associated with the first event type.

5. The method of claim 4, further comprising applying one or more statistical functions on the accumulated interaction data associated with the first event type.

6. The method of claim 3, wherein the interaction data includes a first interaction and wherein the interaction data includes first interaction data, further comprising:
determining that a second interaction associated with the AR experience corresponds to a second event type; and
generating second interaction data for the second event type representing the second interaction.

7. The method of claim 5, further comprising:
separately tracking the first and second interactions using the first and second interaction data; and
generating a message that includes the first and second interaction data in response to receiving a request to terminate the AR experience, the message being sent to a remote server.

8. The method of claim 1, further comprising:
obtaining a map that associates a list of events with a list of custom events of the AR experience;
determining that a first event type of first interaction data corresponds to a first event of the list of events;
determining that a second event type of second interaction data corresponds to a second event of the list of events; and
visually depicting the first and second interaction data in association with the custom events of the AR experience based on the map.

9. The method of claim 1, wherein a first event type is triggered in response to determining a specified camera view being activated during the AR experience, interaction data indicating to a remote server which type of camera view was activated during the AR experience on the user device.

10. The method of claim 9, wherein the specified camera view comprises at least one of front-facing camera view, a rear-facing camera view, or that a specified real-world object is detected in a captured image.

11. The method of claim 1, further comprising:
generating a counter in association with the individual event in response to receiving the input that selects the first option;
determining, by the user device, that the one or more conditions for triggering the tracking of the individual event have been satisfied; and
in response to determining, by the user device, that the one or more conditions for triggering the tracking of the individual event have been satisfied, incrementing the counter, wherein the interaction data comprises value of the counter determined in response to closing of the AR experience.

12. A system comprising:
at least one processor; and
a memory component having instructions stored thereon that, when executed by the at least one processor, cause the at least one processor to perform operations comprising:
presenting, on an augmented reality (AR) developer platform, a graphical user interface for developing an AR experience;
displaying on the graphical user interface a list of different AR events;
receiving input that selects an individual event from the list of different AR events;
in response to receiving the input that selects the individual event, displaying, on the graphical user interface of the AR developer platform, a prompt that comprises a plurality of options for generating metrics associated with the individual event;
receiving input that selects a first option of the plurality of options to enable tracking of the individual event on a user device;
in response to receiving the input that selects the first option of the plurality of options from the graphical user interface to enable tracking of the individual event on the user device, presenting in the graphical user interface a second option associated with defining one or more conditions for triggering the tracking of the individual event;
receiving input via the graphical user interface that selects the second option to define the one or more conditions for triggering the tracking of the individual event; and
storing instructions for generating interaction data based on the first and second options.

13. The system of claim 12, the operations further comprising:
receiving, by the user device, a request to close the AR experience; and in response to the user device on which the AR experience is being accessed receiving the request to close the AR experience, transmitting, by the user device, interaction data to a remote server.

14. The system of claim 12, the operations further comprising:
aggregating interactions into an entity associated with a first event type in response to determining that the interaction data corresponds to the first event type; and
storing the entity as part of interaction data.

15. The system of claim 14, wherein aggregating the interaction data comprises accumulating the interaction data with one or more prior interactions associated with the first event type.

16. The system of claim 12, wherein the individual event comprises a face lost event, the face lost event being triggered when a face of a person is no longer detected within a camera view of the user device.

17. The system of claim 12, wherein the individual event comprises a face found event, the face found event being triggered when a new face of a person is detected by a camera of the user device.

18. The system of claim 12, wherein the one or more conditions comprise at least one of a level of subscription of an end user, a geographical region associated with the end user, a time of day, one or more levels in a gaming application, or specified views or depictions of real-world environment portions.

19. The system of claim 12, the operations comprising:
obtaining a map that associates a list of events with a list of custom events of the AR experience;
determining that a first event type of first interaction data corresponds to a first event of the list of events;
determining that a second event type of second interaction data corresponds to a second event of the list of events; and
visually depicting the first and second interaction data in association with the custom events of the AR experience based on the map.

20. A non-transitory computer-readable storage medium having stored thereon instructions that, when executed by at least one processor, cause the at least one processor to perform operations comprising:
presenting, on an augmented reality (AR) developer platform, a graphical user interface for developing an AR experience;
displaying on the graphical user interface a list of different AR events;
receiving input that selects an individual event from the list of different AR events;
in response to receiving the input that selects the individual event, displaying, on the graphical user interface of the AR developer platform, a prompt that comprises a plurality of options for generating metrics associated with the individual event;
receiving input that selects a first option of the plurality of options to enable tracking of the individual event on a user device;
in response to receiving the input that selects the first option of the plurality of options from the graphical user interface to enable tracking of the individual event on the user device, presenting in the graphical user interface a second option associated with defining one or more conditions for triggering the tracking of the individual event;
receiving input via the graphical user interface that selects the second option to define the one or more conditions for triggering the tracking of the individual event; and
storing instructions for generating interaction data based on the first and second options.

* * * * *